No. 684,686. Patented Oct. 15, 1901.
A. R. GROTZ.
CRACKING OFF APPARATUS FOR GLASSWARE.
(Application filed Mar. 22, 1900.)
(No Model.)

WITNESSES

INVENTOR
Albert R. Grotz
by Bakewell & Bakewell
his Attorneys.

UNITED STATES PATENT OFFICE.

ALBERT R. GROTZ, OF LAZEARVILLE, WEST VIRGINIA, ASSIGNOR OF ONE-HALF TO JAMES PAULL, H. W. PAULL, AND S. O. PAULL, OF WELLSBURG, AND C. B. OTT, OF WHEELING, WEST VIRGINIA.

CRACKING-OFF APPARATUS FOR GLASSWARE.

SPECIFICATION forming part of Letters Patent No. 684,686, dated October 15, 1901.

Application filed March 22, 1900. Serial No. 9,697. (No model.)

*To all whom it may concern:*

Be it known that I, ALBERT R. GROTZ, of Lazearville, in the county of Brooke and State of West Virginia, have invented a new and useful Improvement in Cracking-Off Apparatus for Glassware, of which the following is a full, clear, and exact description, reference being had to the accompanying drawings, forming part of this specification, in which—

Figure 1:
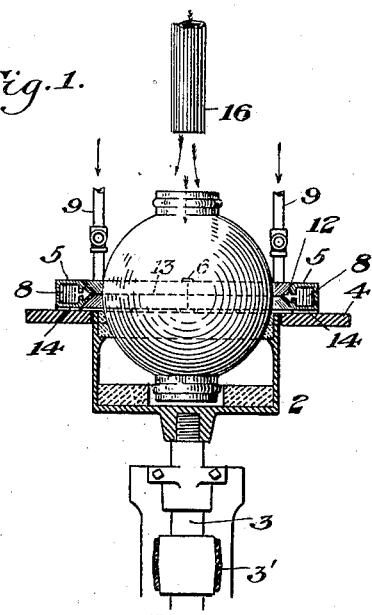
Figure 2:
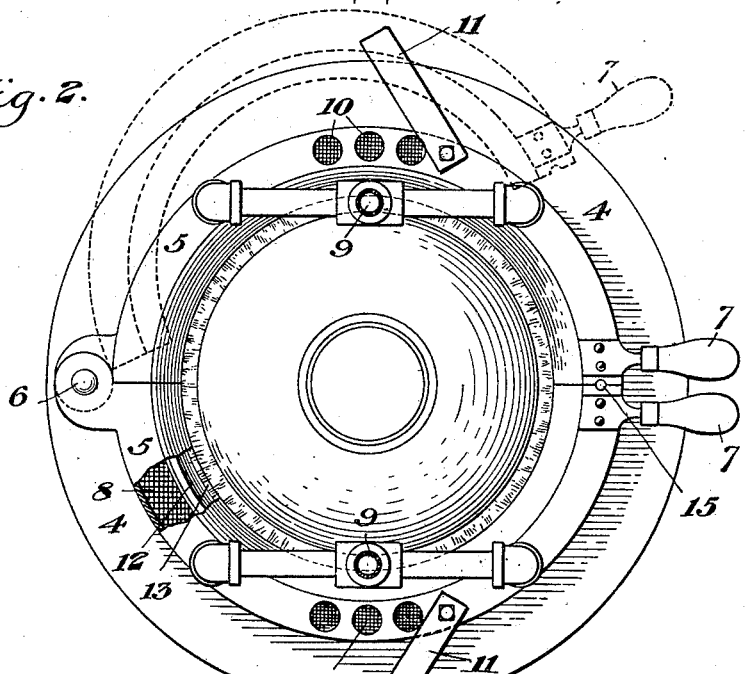
Figure 3:
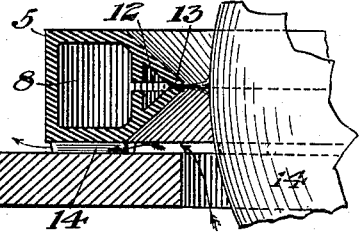

Figure 1 is a side elevation, partly in section, of my improved cracking-off machine. Fig. 2 is a top plan view of the same, and Fig. 3 is a detail cross-section of the burner.

The object of my invention is to provide means whereby articles of glassware can be separated or cracked off quickly and evenly, so that the separated edges can, if desired, be finished and rounded without the expense which attends the hitherto usual grinding operation.

In the drawings, 2 represents a rotary chuck or holder adapted to receive the glass article which is to be separated or cracked off and to rotate it.

3 is a spindle fixed to the chuck and driven by a belt 3', or other suitable driving-gear may be employed.

4 is a table above the chuck, having a central opening for the glass article, and 5 is an annular burner made in sections hinged together by a pin 6, which passes into the table 4. Said burner is adapted to be moved by suitable handles 7 toward or from an interposed glass article. Said burner is formed with a combustion-chamber 8, in which the gas is burned, a gas and air supply pipe 9, and port-holes 10, through which the gas may be ignited, suitable closing-plates 11 being provided by which the port-holes may be closed in whole or in part. On the inner side of the combustion-chamber and communicating therewith is a chamber or passage 12, having a slit or opening 13 opening at the inner side of the burner and adapted to direct a long jet of heated gases upon the side of the glass article to be cracked off. On the under side of the burner is a series of strips or ribs 14, adapted to rest upon the table 4 and to afford an intermediate space between the table and burner through which the heat may pass from the glass below the line at which the annular jet impinges thereupon.

15 is a centering pin or stud enabling the sections of the burner to be accurately closed together.

The operation is as follows: The article of glassware to be cracked off—for example, a double glass shade which is to be divided in two at the middle—is placed in the chuck 2 and is rotated axially thereby. The sections of the burner 5 are then moved on the table 4 so as to bring them toward the glass article, the gas and air mixture having meanwhile been ignited therein. An annular jet of both air and gases passes from the slit 13 and impinges in a single line around the circumference of the glass, rapidly cracking it off, and while this is being done a jet of cold air is blown into the interior of the article through a pipe 16. When the operation is finished, the operator opens the burner by the handles and removes the cracked-off glass article. The action of the hot jet upon the glass is so steady and uniform that the glass does not splinter, and when cracked it can be taken from the machine and finished at a glory-hole without the expensive grinding operations ordinarily needed to finish such articles, and in this way the cost of manufacture is greatly reduced.

The nearness to which the sections of the burner should be caused to approach the glass article depends upon the thickness of the glass and the facility which the device affords for regulating such distance. Where the glass is thick, the sections of the burner should be brought closer to the article than where it is thin, and thus for all grades the operation can be carried on rapidly and without splintering of the glass edges.

Within the scope of my invention changes may be made in the construction of the apparatus, since

What I claim is—

1. A cracking-off machine consisting of a burner of annular form arranged to surround the article and having an internal combustion-chamber inclosed within it, said burner having an outlet-slot arranged to direct the heated gases against the glass article, and a gas and air supply leading to the combustion-chamber; substantially as described.

2. A cracking-off machine consisting of an annular burner composed of sections which are hinged together and arranged to swing to fit around a glass article and a gas and air supply leading to the burner; substantially as described.

3. A cracking-off machine, comprising an annular burner formed in transversely-divided sections movable toward and from each other having a gas-inlet and a gas-outlet and arranged to fit around a glass article, and a chuck for rotating the article; substantially as described.

4. A cracking-off machine comprising an annular sectional burner adapted to fit around the glass article, a table or base-plate on which the burner is supported, and means affording an intermediate air-space between the table and burner; substantially as described.

5. A cracking-off machine comprising a burner with a combustion-chamber and an inner chamber 12 having an opening through which the hot air is discharged upon the glass; substantially as described.

6. A cracking-off machine comprising an annular hinged sectional burner having a gas-inlet and a gas-outlet and adapted to fit around the glass article, and a table or base-plate to which it is hinged; substantially as described.

7. A cracking-off machine comprising an annular burner, adapted to fit around the glass article, said burner having an interior combustion-chamber inclosed therein and a discharge slit or passage; substantially as described.

8. A cracking-off machine comprising an annular burner adapted to fit around the glass article and an air-blast adapted to deliver cold air to the interior of the article; substantially as described.

In testimony whereof I have hereunto set my hand.

ALBERT R. GROTZ.

Witnesses:
LEONARD HILL,
I. C. WIGHT.